(No Model.)
F. SCHOFF.
CORNER DRILL PRESS.
No. 439,567. Patented Oct. 28, 1890.
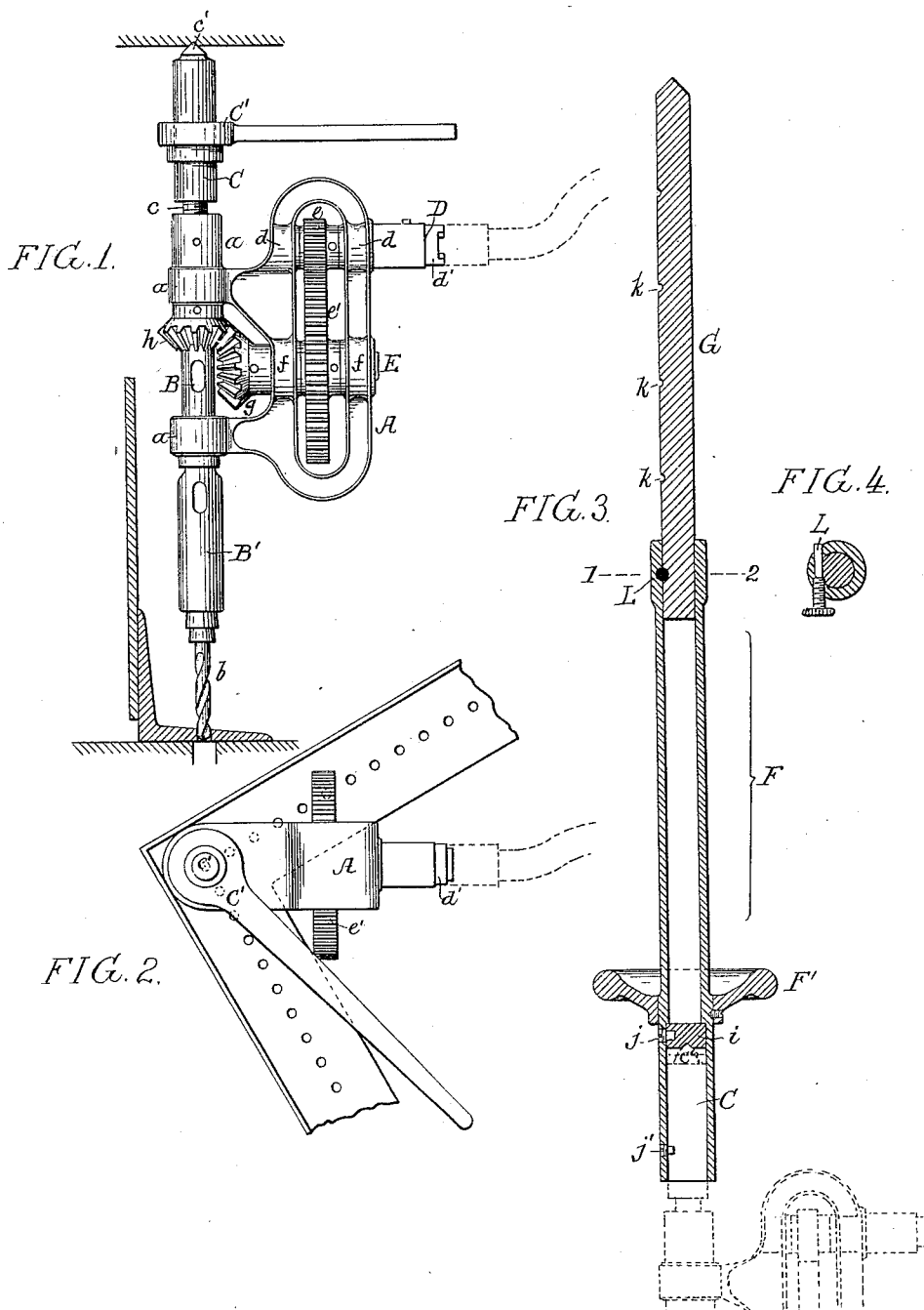
Witnesses:
Murray C. Boyer.
A. V. Groupe.
Inventor:
Frederic Schoff
by his Attorneys
Howson & Howson

UNITED STATES PATENT OFFICE.

FREDERIC SCHOFF, OF PHILADELPHIA, PENNSYLVANIA.

CORNER DRILL-PRESS.

SPECIFICATION forming part of Letters Patent No. 439,567, dated October 28, 1890.

Application filed May 9, 1890. Serial No. 351,170. (No model.)

*To all whom it may concern:*

Be it known that I, FREDERIC SCHOFF, a citizen of the United States, and a resident of Philadelphia, Pennsylvania, have invented an Improved Corner Drill-Press, of which the following is a specification.

The object of my invention is to construct a drill-press for drilling holes in corners.

My invention is especially applicable for use in connection with ship-building and tank-work and bridge-building.

In the accompanying drawings, Figure 1 is a side view of my improved drill-press. Fig. 2 is a plan view. Fig. 3 is a vertical sectional view of the extension-strut; and Fig. 4 is a section on the line 1 2, Fig. 3.

A is the frame of machine carrying the vertical spindle B, adapted to bearings $a\ a$, and has in the present instance at its lower end a tool-carrier B', in which is mounted a tool $b$.

On the upper end of the upper bearing $a$ projects a screw $c$ into a sleeve C, having a point $c'$. On this sleeve is a ratchet-wrench C', of the usual construction, although a plain forked wrench may be used under certain circumstances. The point of the sleeve C presses against a suitable beam or other support, which acts to steady the drill, at the same time serving as a thrust-bearing for driving the drill to its work. A sectional sleeve, described hereinafter, may be added to the screw-sleeve when the beam or support is some distance from the work.

Mounted in bearings $d\ d$ in the upper portion of the frame A is a driving-shaft D, having at its outer end a clutch $d'$ adapted to receive the clutch of a flexible shaft, (shown by dotted lines,) as it will be understood that this machine is a portable drilling-machine, driven in this instance from a shaft having fixed bearings through the medium of a flexible shaft, although it may be provided with a pulley and driven by belting, or on light work a crank or hand wheel may be applied, when it can be driven by hand.

On the shaft D is a pinion $e$, gearing with a gear-wheel $e'$ on a shaft E, adapted to bearings $f\ f$ in the frame A. On the inner end of this shaft is a bevel gear-wheel $g$, meshing with a bevel gear-wheel $h$ on the vertical spindle B. These two wheels are comparatively small, being a trifle larger in the present instance than the bearings $a\ a$, so that the spindle carrying the tool can be inserted into a comparatively sharp corner. The frame being narrow and the gear-wheels $e\ e'$ being some distance from the vertical line of the spindle, they can be made of a diameter sufficient for the reduction in speed required between the flexible driving-shaft and the driven shaft, and by using the ratchet the drill can be used in comparatively sharp corners. When a bearing cannot be had near the point of the drill, I remove the wrench from the sleeve and apply the sectional sleeve F, Fig. 3, to the sleeve C, the point C' resting against the thrust-block $i$, secured to the sleeve F by a screw-pin $j$. A pin $j'$ passes into an orifice in the sleeve C, locking the sleeve to the extension-sleeve F, the handle F' on the latter being used to feed the drill to its work, although a ratchet-wrench may replace the handle in some instances.

Sliding in the extension F is a rod G, which has a series of grooves $k$ cut, as shown in Fig. 3. A screw-pin L, Fig. 4, in the sleeve F passes into one of these grooves, holding the rod in the position required. This rod can be made of any length, and a series of rods may be supplied with each machine, as circumstances require.

I claim as my invention—

1. The combination, in a corner drill-press, of the narrow frame A, the vertical spindle B, feed mechanism therefor, the driving-shaft mounted in bearings on the frame A, having a clutch at one end adapted to engage with a clutch of a flexible shaft, an intermediate shaft, reducing-gear between it and the driving-shaft, and small bevel gear-wheels gearing the intermediate shaft with the spindle, whereby the spindle can be adjusted to a corner, substantially as described.

2. The combination of the frame A, the spindle, and mechanism for driving said spindle, with a feed-screw $c$, a sleeve C, an extension-sleeve F, adapted to said sleeve C, said extension-sleeve having a handle F', and a bearing $i$ for the screw-sleeve, substantially as described.

3. The combination of the frame A, the vertical spindle adapted to bearing therein, a feed-screw projecting from the frame A, and screw-sleeve adapted to said screw-extension sleeve F, with a rod G adjustably secured to the sleeve, substantially as described.

4. The combination, in a corner drill-press, of the frame, a vertical spindle B, carrying the tool at its lower end and adapted to bearings on the inner end of the frame, with a horizontal driving-shaft D, having a clutch adapted to engage with the clutch of a flexible shaft, a pinion on said driving-shaft, with an intermediate shaft, gear-wheel on said shaft meshing with the pinion, a bevel-wheel on the intermediate shaft meshing with a bevel-wheel on the spindle, a screw-shaft, a screw-sleeve adapted to said shaft, and an extension-sleeve adapted to said screw-sleeve, substantially as described.

In testimony whereof I have signed my name to this specification in the presence of two subscribing witnesses.

FREDERIC SCHOFF.

Witnesses:
HENRY HOWSON,
HARRY SMITH.